United States Patent [19]

Kronies

[11] 4,241,419
[45] Dec. 23, 1980

[54] ASYNCHRONOUS DIGITAL DATA TRANSMISSION SYSTEM

[75] Inventor: Reinhard K. Kronies, Fountain Valley, Calif.

[73] Assignee: Burroughs Corporation, Detroit, Mich.

[21] Appl. No.: 901,870

[22] Filed: May 1, 1978

Related U.S. Application Data

[60] Continuation of Ser. No. 742,745, Nov. 18, 1976, abandoned, which is a continuation of Ser. No. 519,831, Nov. 1, 1974, abandoned, which is a division of Ser. No. 123,959, Mar. 15, 1971, Pat. No. 3,742,253.

[51] Int. Cl.³ .............................................. G06F 3/00
[52] U.S. Cl. .................................................... 364/900
[58] Field of Search ... 364/900 MS File, 200 MS File; 307/215, 208, 291

[56] References Cited

U.S. PATENT DOCUMENTS

| 3,469,948 | 9/1969 | Barlow et al. | 364/900 |
| 3,609,569 | 9/1971 | Todd | 307/208 X |
| 3,753,014 | 8/1973 | Kronies | 307/291 X |

OTHER PUBLICATIONS

Maley et al.–Auto-Reset Ternary Latch–IBM Tech. Dis. Bul., vol. 14, No. 2; 7/71; pp. 630-631.

Primary Examiner—Harvey E. Springborn
Attorney, Agent, or Firm—Nathan Cass; Kevin R. Peterson; David G. Rasmussen

[57] ABSTRACT

A transmission system is disclosed for transmitting asynchronous binary signals from a source to a selected utilization device without requiring a system clock common to the source and utilization device. The system includes apparatus for converting the asynchronous binary signals into complementary pairs for transmission to respective electronic devices. Each electronic device is capable of transmitting a complementary pair applied thereto to the utilization device while also being responsive to applied 1, 1 inputs from a strobe circuit to prevent transmission to the utilization device when such transmission is to be prevented. A presence detecting circuit responsive to the outputs of the electronic devices detects when all of the data bits have arrived and initiates operation of the utilization means in response thereto.

4 Claims, 8 Drawing Figures

ASYNCHRONOUS DIGITAL DATA TRANSMISSION SYSTEM

CROSS REFERENCE TO RELATED APPLICATION

This application is a continuation of U.S. Patent Application Ser. No. 742,745, filed Nov. 18, 1976 (now abandoned), which is in turn a continuation of U.S. Patent Application Ser. No. 519,831, filed Nov. 1, 1974 (now abandoned), which is in turn a division of U.S. Patent Application Ser. No. 123,959, filed Mar. 15, 1971 (now U.S. Pat. No. 3,742,253).

BACKGROUND OF THE INVENTION

This invention relates to improved apparatus for transmitting asynchronous binary signals from a source to a utilization device without requiring a system clock common to the source and utilization device.

In transferring data on plural channels, an additional strobe signal on an additional channel has been employed in the past to indicate when the information is absolutely present at the receiver. The timing of this strobe signal is typically adjusted for the worst case transfer path and may need to be readjusted for each modification of configuration in the system, and particularly in the case of different cabling structures. Additionally, in the past the transfer of asynchronous signals from a requestor unit such as a data processor to a memory in a memory module has been done by a clock signal that was delayed to take into consideration the worst case transfer path. This results in an unnecessary delay in the starting of the memory cycle because the memory cycle may be self-started or automatically started in accordance with the present invention.

SUMMARY OF THE INVENTION

An asynchronous transmission system in accordance with a preferred embodiment of the invention includes a transmitter unit and a receiver unit coupled to the transmitter unit by a pair of data lines. The receiver unit includes an electronic device or circuit that is responsive to three combinations of binary input signals. The transmitter unit includes a source of binary data to be transmitted to the receiver unit and circuity, such as a source of strobe signals, for applying one combination of binary signals, which may advantageously be binary ones, to the pair of data lines to indicate at the receiver unit that no data is present at the transmitter unit to be transmitted to the receiver unit. The transmitter unit may further include plural sources of binary data and circuitry for applying the one combination of binary signals, such as 2 binary 1's, to the pair of data lines to indicate that conflicting data is present, so that no data is transmitted to the receiver unit until only the data from the one desired source is present.

BRIEF DESCRIPTION OF THE DRAWINGS

These and other features and advantages of the present invention may be understood more clearly and fully upon consideration of the following specification and drawings in which.

DESCRIPTION OF THE PREFERRED EMBODIMENT

Figures 1, 2, 3, 4, 5:
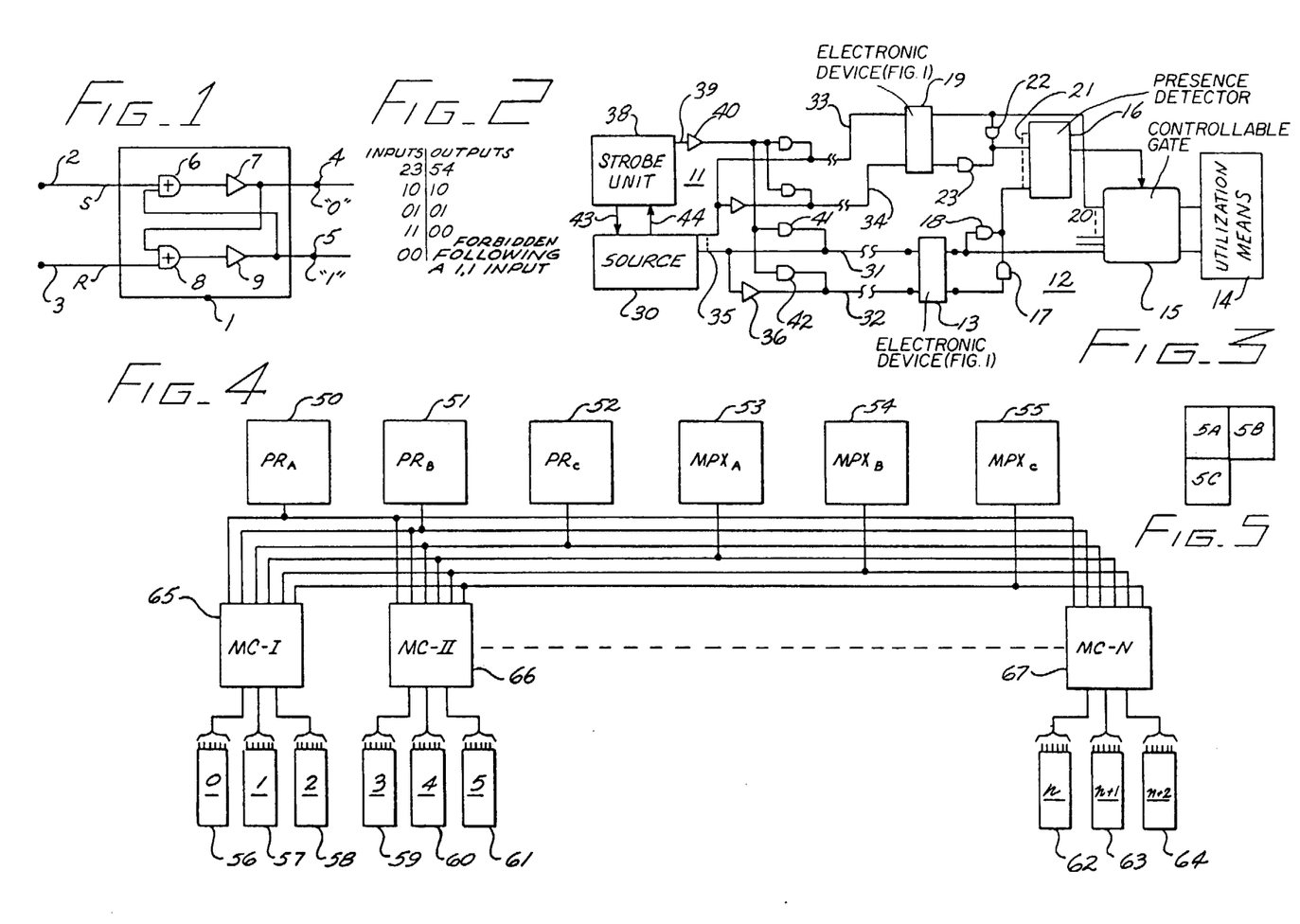
FIG. 1 is a block diagram of an electronic circuit employed in the present invention.
FIG. 2 is a truth table of the electronic circuit of FIG. 1.
FIG. 3 is a block and schematic diagram of an asynchronous transmission system employing the electronic circuit of FIG. 1.
FIG. 4 is a block diagram of a computer system in which the transmission system of FIG. 3 is useful.

The electronic circuit 1 shown in schematic form in FIG. 1 has two input terminals 2 and 3 and two output terminals 4 and 5. The electronic circuit 1 includes an OR gate 6 and an inverter 7 connected between input terminal 2 and output terminal 4. The electronic circuit 1 may further include a second OR gate 8 and a second inverter 9 connected between the input terminal 3 and the output terminal 5. The output of inverter 9 is coupled to OR gate 6 as one input thereto, and the output of inverter 7 is coupled to OR gate 8 as one input to OR gate 8. Logic OR gates are represented in the drawing of this application by plus signs within the blocks for the element and logic AND gates are represented by dots within the block for the element.

The electronic circuit of FIG. 1 operates in response to pulsed or continuous binary signals as illustrated by the truth table of FIG. 2 with input terminal 2 being the set input, and input terminal 3 being the reset input, and output terminal 5 being the "1" or "on" output, and the output terminal 4 being the "0" or "off" output.

As shown in the truth table of FIG. 2, when two binary 1's are applied to the inputs, two binary zeros appear at the outputs 4 and 5. However, the application of two binary zeros to the inputs 2 and 3 following the application of two binary 1's is forbidden because the output would be unpredictable.

For the purposes of this application, the terms "logic true" and "logic false" will be used interchangeably with the terms "binary 1" and "binary 0", respectively, unless specifically noted otherwise. However, this usage is not meant to detract from the broader definition of the terms "binary coded data" and "binary 1's" and "binary 0's", which terms in themselves include logic trues and logic falses, which are binary.

The electronic circuit of FIG. 1 is useful in a system for transmitting information from a transmitter unit to a receiver unit. Such a transmission system is shown partially in block form and partially in binary logic form in FIG. 3. The portion of the system to the left of the break in the data lines forms a transmitter unit 11, and the portion of the system to the right of the break forms a receiver unit 12. The receiver unit 12 includes an electronic device 13, identical to the one shown in FIG. 1, and a utilization device 14. Between the electronic device 13 and utilization device 14 may be positioned a controllable gate 15, which is controlled by the output of a presence detector circuit 16. The two output terminals of the electronic device 13 are connected through a pair of isolation gates 17 and 18 to one input terminal of the presence detector 16. If the transmission system includes a plurality of lines for the transfer of plural bits of binary data from the transmitter unit 11 to the receiver unit 12, then the receiver unit 12 may further include as many electronic units as there are paired transmission lines between the transmitter unit 11 and receiver unit 12. The last of a plurality of electronic devices is represented by the electronic device 19 connected to the input terminal 20 of controllable gate 15 and to the input terminal 21 of presence detector 16 through a pair of isolation gates 22 and 23 at the output of the electronic device.

The transmitter unit 11 includes a source 30 of binary coded data which may be a source of a single bit of data, or a source of plural bits of data to be transmitted in parallel to the receiver unit 12. The single bit of data may be transferred over the pair of data lines 31 and 32 connected between the transmitter unit 11 and the receiver unit 12. If plural bits of data are to be transferred in parallel, then additional data lines such as data lines 33 and 34 will be coupled between the transmitter unit 11 and receiver unit 12. The output of the source 30 of binary coded data is represented as a single ended output by output line 35. This single line 35 is connected directly to data line 31 and through an inverter 36 to data line 32 so that the complement of the binary output signal from source 30 is applied to data line 32. Of course, the inverter 36 would not be necessary if the output of the source 30 was double railed or double ended so that the complement of the binary data would be present at the second output of the source 30. A source 38 of strobe signals cooperates with source 30 to produce a strobe signal when binary data is present at the output of the source 30 to be transferred to the receiver unit 12. The strobe signal may appear as a binary one at the output terminal 39 of strobe source 38. The output terminal 39 is coupled through an inverter 40 and an isolation gate 41 to data line 31 and through another isolation gate 42 to data line 32 so that the inverse of the output of the strobe source 38 is applied to the two data lines.

The electronic devices 13 and 19 and any others employed in the receiver unit 12 will indicate the presence of synchronous asynchronous information on their respective data channels 31, 32 and 33, 34 as follows. The information from the source 30 is developed in double railed format by the use of the inverter 36. The strobe inverter 40 holds both data lines 31 and 32 as well as all other data lines, such as data lines 33 and 34, true until a strobe signal appears at the output of strobe source 38. With a true on both inputs to the electronic devices 13 and 19, both outputs will be false or binary 0's, indicating the absence of information on the data channels. A strobe signal, in the form of a binary 1, will appear at the output of the strobe source 38 when binary data from source 30 is present at the output of source 30 by coupling source 30 and strobe source 38 together through the control lines 43 and 44 in a normal manner. When the binary 1 or strobe signal appears at the output 39, the two trues will be removed from all data lines so that the binary output from the source 30 will be the only signals present on the data lines. Thereupon the data information will be transferred from source 30 to the receiver unit 12 through the electronic devices 13 and 19. The presence of information will be indicated at the output of electronic device 13 by the presence of a binary 1 on one of the two output terminals. This binary one will be coupled through isolation gate 17 or 18 to the presence detector 16, which may then control the gate 15 for the passage of data from the electronic device 13 to the utilization device 14. When several channels of information are sent to the receiver unit 12 via the data lines, a presence output in the form of a binary one will occur at the output of each of the electronic devices, such as devices 13 and 19 in the receiver unit 12. These presence signals are applied to presence detector 16, which is advantageously an AND gate, which will have an output only when information is present at the output of all of the electronic devices. The presence detector 16 controls the operation of the gate 15 for the passage of all the data to the utilization device 14.

The output of the presence detector 16, which appears as soon as all of the information from transmitter unit 11 is present in the receiver unit 12, may also be used as a control signal in the utilization device 14. In particular, the utilization device 14 may be a randomly accessible memory and the information being transferred from the transmitter unit to the receiver unit may be the memory address to be used by the memory of the utilization device 14. In this case it is desirable to start the memory cycle as soon as all of the address information is present in the receiver unit 12. The presence of all of this information is indicated by the output of presence detector 16 and may be used to automatically start the memory cycle. Since this is done without the use of a clock signal, it may be termed self-starting of the memory cycle.

The ability to self-start, or automatically start, the memory cycle when a memory is accessed is particularly desirable when a memory may be accessed by any one of a plurality of requestors, which requestors may be located substantially different distances from the memory. A computer system having a plurality of requestors and a plurality of memory modules is representatively shown in block form in FIG. 4. The requestors are six in number and are made up of processor 50, processor 51, and processor 52, respectively designated $PR_A$, $PR_B$, $PR_C$, and multiplexors 53, 54 and 55, respectively designated $MPX_A$, $MPX_B$, and $MPX_C$. The computer system may be made up of fewer or more requestors, and the combination of processors and/or multiplexors may also be different.

For purpose of illustration, it is assumed that each requestor may access any one of a number of memory modules representatively shown by modules 56 through 64 in FIG. 4. The access to each memory module is controlled by a memory control unit representatively shown in block form by memory control units 65, 66, and 67 in FIG. 4. Each memory control unit, such as memory control unit 66, controls access to three memory modules such as modules 59, 60 and 61. The accessing of the memory modules and the self-starting of the memory cycle may be better understood by reference to the more detailed diagram of FIGS. 5A, 5B, and 5C, positioned as shown in FIG. 5. It is assumed that access is being sought to module 61 by requestors 50 and 51 and that requestor 50 has been given the higher priority over requestor 51 so that concurrent attempts to access the same memory module will result in access being granted to requestor 50 over requestor 51. A portion of the memory control unit 66 is shown in block and binary logic form in FIGS. 5A and 5C and the memory modules 59 and 60 are shown in block form in FIG. 5B, with memory module 61 being shown in more detail in FIG. 5B.

In a typical computer system, the cabling between the requestors 50 through 55 and the memory control units 65 through 67 contains 80 lines, with the following assignments being made for these lines. Six lines carry the address for the module to which access is being sought. Fourteen lines carry the memory address, that is the location within the memory from where the information is to be read or in which the information is to be stored. Fifty-two lines carry the information. Six lines carry control signals, only one of which will be considered in detail as being necessary for an understanding of this invention, and two lines are spares.

The one control line that will be considered in detail is the line from each requestor that carries the signal which indicates that a requestor is requesting access to a memory module. Since each requestor may communicate with each memory module, the memory address lines are connected from each requestor to the memory module through an address crosspoint unit representatively shown by the single address crosspoint unit 70 in FIG. 5C. Similarly, the information lines from each requestor are connected to each memory module through a read crosspoint unit and a write crosspoint unit, such as the read crosspoint unit 71 and write crosspoint unit 72 shown in block form in FIG. 5A, associated with memory module 61. Thus in a memory control unit, such as memory control unit 66, there will be a read crosspoint unit, such as unit 71, for each memory module controlled by that particular memory control unit and a write crosspoint unit, such as unit 72, for each memory module controlled by that particular memory control unit. The read and write crosspoint units will have 52 lines from each requestor and 52 lines to its respective memory module. In the address crosspoint unit 70 of FIG. 5C, the control unit for only one address line of the 14 address lines is shown in schematic form. However, the control units for the other 13 lines for the memory address in the address crosspoint unit 70 are identical. Thus, there will be 14 lines from each requestor to the address crosspoint unit for each memory module and 28 lines from each address crosspoint unit to the memory module, as represented by the lines 73 and 74 in FIG. 5C, since the output of the address crosspoint unit is double railed. The transmission of data through the crosspoint units 70, 71 and 72 is controlled by a crosspoint control unit 75, shown in block and binary logic form in FIG. 5A, for controlling an access request by requestor 50. A crosspoint control unit 76 is also shown in block and binary logic form in FIG. 5A for controlling an access request by requestor 51. There will be similar crosspoint control units in memory control unit 66 for each one of the other requestors 52 through 55.

Figure 5A:
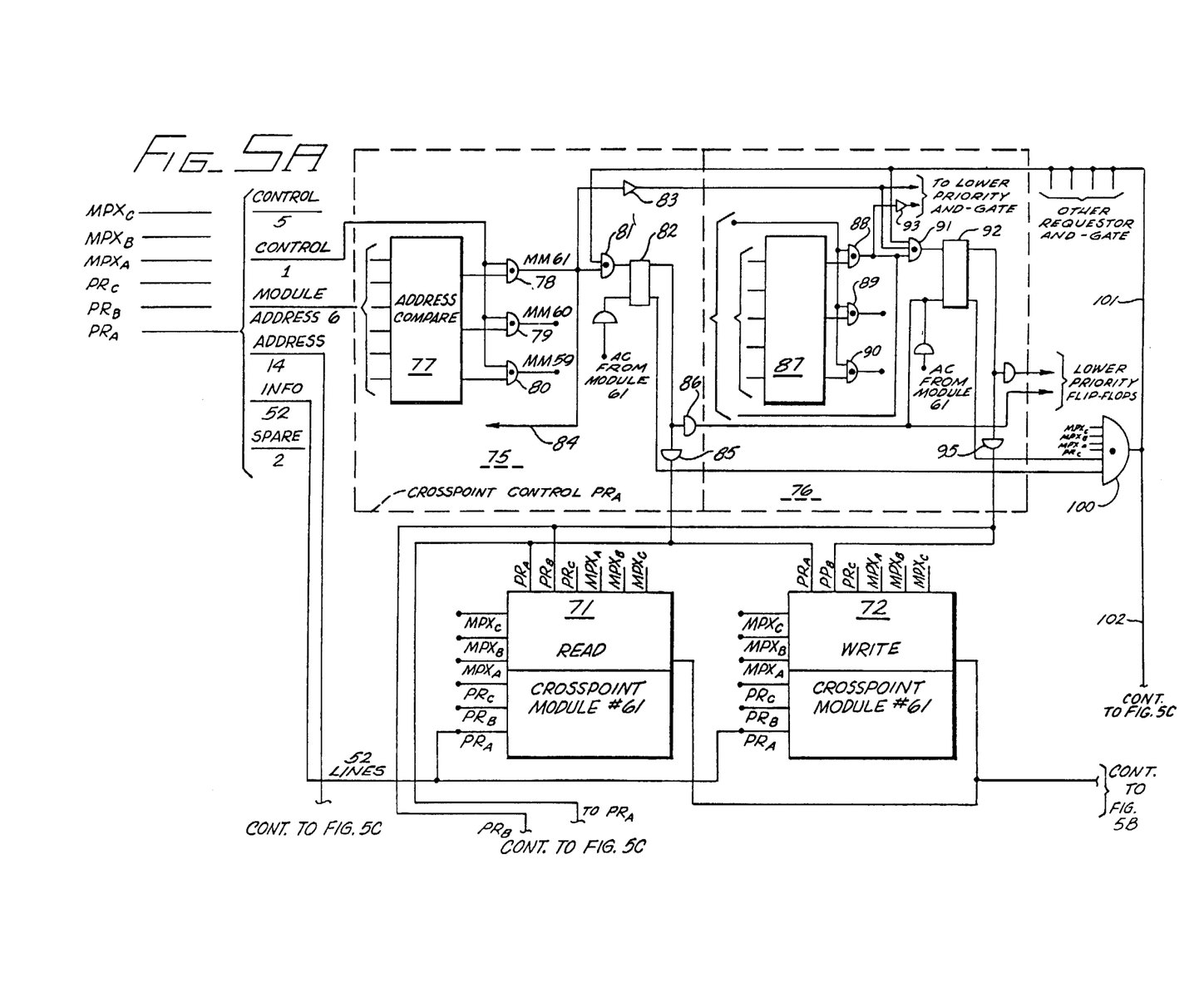
FIGS. 5A, 5B, and 5C, positioned as shown in FIG. 5, form a schematic and block diagram of a portion of the computer system of FIG. 4.

Crosspoint control unit 75 includes a logic circuit 77 for comparing or decoding each module address from requestor 50 to determine if access is being sought by requestor 50 to one of the three memory modules 59, 60 and 61 controlled by memory control unit 66. The address compare circuit 77 has an output terminal for each of the controlled memory modules. Each output terminal is coupled to one terminal of a two input AND gate associated with a particular memory module. At the output of address compare circuit 77 is an AND gate 78 associated with module 61, and AND gate 79 associated with module 60, and an AND gate 80 associated with module 59. Each of the AND gates has its second input coupled to the control line from requestor 50 on which the access request signal is carried. The remainder of the crosspoint control unit for each controlled memory module is identical so that the circuitry for only module 61 will be explained. The single output of AND gate 78 is connected to one input terminal of an AND gate 81. The output terminal of AND gate 81 is connected to the set input of a flip-flop 82. Flip-flop 82 functions as a crosspoint control flip-flop and provides an output, binary 1, which functions as an access granted signal when set by a binary 1 input. The request recognized signal at the output of AND gate 78 is also coupled through an inverter 83 to the crosspoint control unit of each lower priority requestor. Additionally, the request recognized signal is coupled by line 84 back to the requestor to inform the requestor that the crosspoint control unit has received the request for access signal and that it has been recognized and the memory module identified, and that the requestor should have the information that is to be used in the accessed memory module at the memory control unit.

Crosspoint control unit 76 has an identical construction and has an address compare circuit 87, AND gates 88, 89 and 90 connected to the output of address compare circuit 87, and AND gate 91 connected to the output of AND gate 88 and a crossspoint flip-flop 92 having its set input terminal connected to the output of AND gate 91. AND gate 91 has one more input terminal than does AND gate 81 of crosspoint control unit 75 of the higher priority requestor 50. The crosspoint control unit for each lower priority requestor will have the not or the complement of the request recognized signal applied from the crosspoint control unit of each higher priority requestor, as shown in crosspoint control unit 76 for requestor 51 by the third input to AND gate 91. Thus, the request recognized signal from the output of AND gate 88 is coupled through an inverter 93 to the AND gates in the crosspoint control units of each lower priority requestor in the same way that the request recognized signal of requestor 50 is coupled through inverter 83 to one input of AND gate 91 of crosspoint control unit 76 for requestor 51.

The output of the crosspoint flip-flop for each requestor is connected to the read crosspoint unit 71, write crosspoint unit 72, and address crosspoint unit 70. For example, the output of flip-flop 82 of requestor 50 is coupled through an isolation gate or decoupling gate 85 to the input terminal of read crosspoint unit 71, of write crosspoint unit 72, and of address crosspoint unit 70 that is associated with requestor 50. Similarly, the output of crosspoint flip-flop 92 for requestor 51 is coupled through an isolation gate 95 to its respective input terminals of the crosspoint units 70, 71, and 72. The "0" or "off" output of the crosspoint flip-flops 82, 92, etc. associated with each requestor is coupled to an AND gate 100, which has an input for each of the requestors. The output of AND gate 100 is connected through line 101 to AND gate 81 in crosspoint control unit 75 for requestor 50, AND gate 91 in crosspoint control unit 76 for requestor 51, and will be connected to similar AND gates in the crosspoint control units for the other requestors. The output of AND gate 100 is also connected to the output lines 73 and 74 of address crosspoint unit 70 through line 102. The "1" or "on" output of flip-flop 82 is also coupled through an isolation gate 86 to the reset side of crosspoint flip-flop 92 in crosspoint control unit 76. The "on" output of flip-flop 82 is similarly connected to the crosspoint flip-flops in the crosspoint control units for each lower priority requestor. Similarly, the "on" output of flip-flop 92 is coupled to the reset inputs of the flip-flops of the crosspoint control units for each lower priority requestor.

Figure 5B:
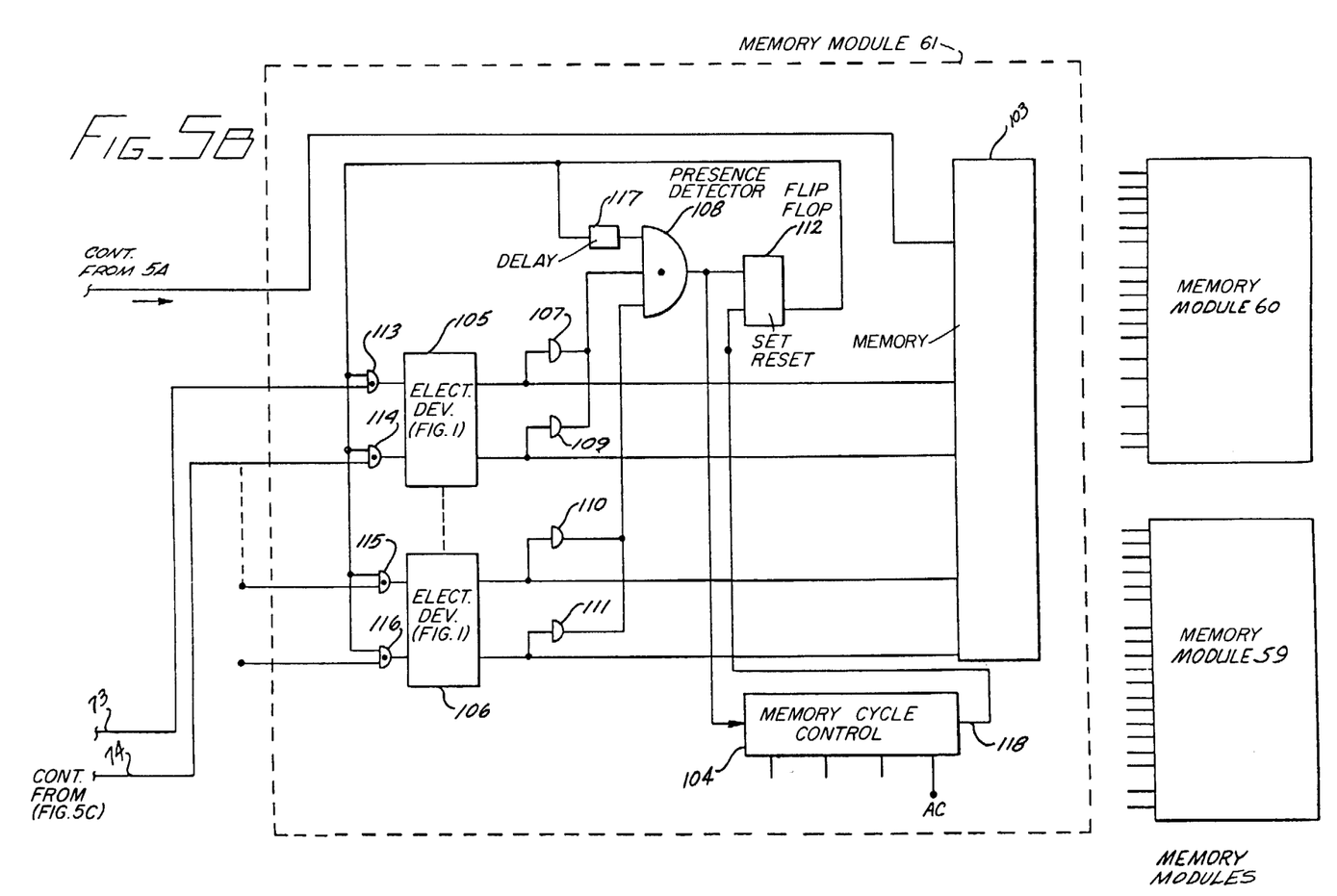
Figure 5C:
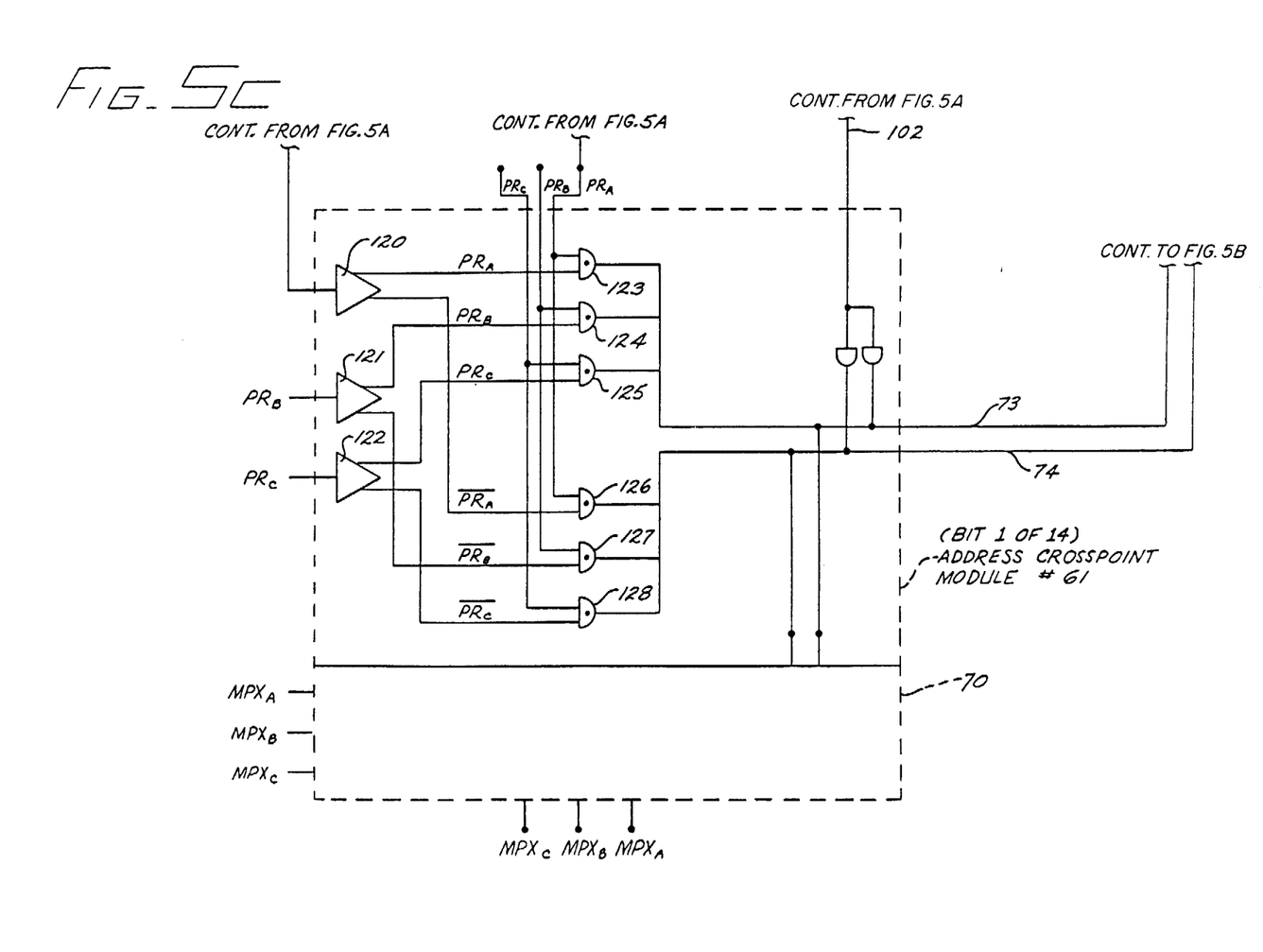

The memory modules 56 through 64 are all identical and are representatively shown in block and schematic form by memory module 61 in FIG. 5B. Memory module 61 includes a memory 103 and interface with a portion of the interface being shown in more detail in FIG. 5B. The portion shown in greater detail includes a memory cycle control unit 104. The interface further includes an electronic device 105 for the first bit of memory address, and an electronic device 106 for the last bit of memory address. Each of these electronic devices 105 and 106 is constructed as illustrated in FIG. 1 for operation in accordance with the truth table of FIG. 2. There will also be additional electronic devices for each of the other bits of memory address. The "on" output line of electronic device 105 is connected through an isolation gate 107 to one input terminal of a presence detector 108, which may be an AND gate. The "off" output terminal of electronic device 105 is coupled through an isolation gate 109 to the same input of presence detector 108. Similarly, the outputs of electronic device 106 are connected through isolation gates 110 and 111 to one input of presence detector 108. The output of presence detector 108 is connected to the set side of a flip-flop 112 and to one input terminal of memory cycle control unit 104. The reset side of flip-flop 112 is connected to one output terminal of memory cycle control unit 104. The "off" output of flip-flop 112 is connected through a delay unit 117 to one input terminal of presence detector 108. The "off" output of flip-flop 112 is also connected to one input terminal of each of the AND gates 113, 114, 115, and 116. AND gate 113 is connected to the set input terminal of electronic device 105 and AND gate 114 is connected to the reset input of electronic device 105. AND gate 115 is connected to the set input of electronic device 106 and AND gate 116 is connected to the reset input of electronic device 106. Each of the AND gates 113, 114, 115 and 116 will have an input from an address crosspoint control unit, such as address crosspoint control unit 70, with AND gate 113 having one input connected by line 73 to the output of address crosspoint unit 70 and AND gate 114 having one input connected by line 74 to the second output of address crosspoint unit 70.

Each of the address crosspoint units, which are representatively shown by address crosspoint unit 70 in FIG. 5C, includes a driver for the respective bit of memory address from each requestor. For example, a driver 120 is associated with requestor 50, driver 121 is associated with requestor 51, and driver 122 is associated with requestor 52. Each driver has a double ended output with one output of driver 120 being applied to one input of an AND gate 123 and the other output of driver 120 being connected to one input of AND gate 126, the second output of driver 120 being the binary not or the complement of the first output. One output of driver 121 is connected to one input of an AND gate 124, and the not output of driver 121 is connected to one input of an AND gate 127. One output of driver 122 is connected to one input of an AND gate 125 and the not output of driver 122 is connected to one input of an AND gate 128. Each of the AND gates 123 through 128 functions like a transmission gate and requires an enabling signal of a binary 1 on its second input.

The use of the transmission system of FIG. 3 in the address crosspoint unit and memory module, as shown in FIGS. 5C and 5B in conjunction with the crosspoint control units 75 and 76 and the other crosspoint control units for the other requestors, results in a computer system capable of handling asynchronous information from numerous requestors, of starting the memory cycle as soon as the complete memory address is present at the memory module, of granting access to the highest priority requestor while locking out the other requestors until the memory cycle has started and the information from the requestor to which access has been granted is present in the memory module, and of resolving the priority between requestors subsequently seeking access after a memory cycle begins and storing the request recognized signal for the highest priority requestor which is seeking access. These and other features and advantages may be understood more easily and clearly by consideration of the operation of the memory control unit and the controlled memory module as representatively shown by the portion of the memory control unit 66 and memory module 61 set forth in FIGS. 5A, 5B, and 5C.

Assuming first for purposes of illustration that only requestor 50 is seeking access to memory module 61 through memory control unit 66 and its memory request signal and module address and memory address are present in the control unit 66, the timing of the information from requestor 50 is such that both the module address and the memory address appear at the memory control unit before any of the other information. In this way it is assured that the memory address is present before any action is taken by the memory module being accessed. With the appearance of the module address at address compare unit 77, the module for which access is being requested will be identified and a binary 1 for module 61 will appear at one input terminal of AND gate 78. Concurrently, or a short time later, the memory request signal from requestor 50 will appear at the second input to AND gate 78 and a binary 1 will then appear at the output of AND gate 78. The binary 1, which represents the request recognized signal, is coupled by line 84 back to the requestor to tell the requestor that the address has been received and that the memory control unit and its identified and associated memory module 61 are ready to proceed in the communication with the requestor. Since it is assumed that only requestor 50 is seeking access to memory module 61, the outputs of all of the crosspoint flip-flops 82, 92, etc., will be a binary 0 and the not output will be a binary 1. Thus, each of the input lines to AND gate 100 will have a binary 1 so that the output of AND gate 100 will be a binary 1, which binary 1 will be applied through line 101 to the second input terminal of AND gate 81. With a binary 1 on both inputs to AND gate 81, there will appear a binary 1 at the output of AND gate 81. This binary 1 being applied to the set input of crosspoint flip-flop 82 will set this flip-flop and cause it to have a binary 1 on the "on" output of the flip-flop, which will function as an access granted signal. The binary 1 on the "on" output of crosspoint flip-flop 82 will be applied to the reset input of crosspoint flip-flop 92 and the other crosspoint flip-flops for the other lower priority requestors so that all lower priority requestors will be inhibited from transferring information through the crosspoint control units 70, 71 and 72 to memory module 61. The "off" output terminal of flip-flop 82 will now have a binary 0, which will be applied to one input terminal of AND gate 100, causing the output of AND gate 100 to become a binary 0. This binary 0 will be coupled through line 101 to AND gates, 81, 91, and the other corresponding AND gates of the crosspoint control units for the lower priority requestors to inhibit the transfer of any request recognized signal so that no further crosspoint flip-flops may be set. In this way the setting of crosspoint flip-flop 82 is retained so that a binary 1 will continue to appear at its output. The binary 1 at the output of flip-flop 82 is coupled through isolation gate 85 to read crosspoint unit 71 and write crosspoint unit 72 to enable these crosspoint units so that the information may be transferred between the requestor 50 and the memory module 61. This binary 1 is also applied to address crosspoint unit 70 and the other crosspoint units for the remainder of the memory address. The application of the binary 1 to the address crosspoint unit 70 enables AND gates 123 and 126 so that the memory address may be transferred from driver 120 through output lines 73 and 74 to AND gates 113 and 114 in memory module 61. If the memory in memory module 61 is idle, there will be a binary 1 applied to the reset input of flip-flop 112 so that a binary 1 will appear at the "off" output, which is the only output of flip-flop 112 that is employed. The binary 1 on the output flip-flop 112 will be applied to the second input of AND gates 113 to 116 to enable these AND gates to permit the application of the memory address to the electronic devices 105 and 106 and the other electronic devices for the remaining bits of memory address.

Before the request recognized signal is coupled through AND gate 81 to set flip-flop 82, which removes the binary 1 at the output of AND gate 100, the binary 1 is applied to both lines 73 and 74 through line 102. The application of a binary 1 to both lines prevents the address bit from being transferred over lines 73 and 74 to electronic devices 105 as explained above. Upon the setting of crosspoint flip-flop 82 by the request recognized signal, which is coupled through AND gate 81, the binary 1 at the output of AND gate 100 is removed so that the memory address may be transferred to the memory module 61. When all of the memory address is present in the electronic devices at the receiving end in the memory module 61, a binary 1 will appear on one of the output terminals of each of the electronic devices so that a binary 1 will be applied to each input terminal of presence detector 108. With a binary 1 on each input to presence detector 108, a binary 1 will appear at the output and will be applied to the set input of flip-flop 112 and the one input terminal of memory cycle control unit 104. The binary 1 applied to set input terminal of flip-flop 112 will cause a binary 0 to appear on the output terminal, which will be applied to AND gates 113 through 116 to freeze the electronic devices 105 to 106 in their condition at that time so that the memory address will be stored in these electronic devices. The binary 1 at the output of presence detector 108 will also be applied to memory cycle control unit 104 to start the memory cycle. Memory cycle control unit 104 will produce a number of control signals which will be used, for example, to inform the requestor that memory access has begun, to strobe the transfer of read data from the memory, and to perform other functions during the memory cycle. The memory cycle control unit 104 will also produce an access completed signal in the form of a binary 1 on output terminal AC which will be coupled back to each crosspoint control unit to reset the crosspoint flip-flops therein to remove the enabling signal on the read, write, and address crosspoint units 71, 72, and 70. The access completed signal will be applied to the reset input of crosspoint flip-flop 82 when it is generated by memory cycle control unit 104, and will remove the binary 1 on the "on" output terminal and will also cause a binary 1 to appear on the "off" output terminal of flip-flop 82. With the appearance of a binary 1 on the "off" output terminal of flip-flop 82 and the resetting of the crosspoint flip-flops in all of the other crosspoint control units, there will be a binary 1 on all of the inputs to AND gate 100. AND gate 100 will have a binary 1 on its output which will be applied through line 101 to enable AND gates 81 and 91 and the similar AND gates in the other crosspoint control units. Thereupon any request recognized signal that may exist in the crosspoint control unit for any other requestor may be applied to its crosspoint control flip-flop to store the request recognized signal for use when the memory module is again idle. This condition of completion of the memory cycle and the memory becoming idle is indicated by a memory idle signal at output terminal 118 of memory cycle control unit 104. The memory idle signal in the form of a binary 1 is applied to the reset input of flip-flop 112 to remove the address freeze signal and to enable AND gates 113 through 116 so that the next memory address may be transferred to the memory module 61.

Assume now for purposes of illustration that both requestors 50 and 51 are seeking access to memory module 61 through memory control unit 66 and that at least the first bit of the memory address from each requestor is in conflict and that the first bit from requestor 50 is a binary 1 and the first bit from requestor 51 is a binary 0. The binary 1 from requestor 50 will be applied to driver 120 in address crosspoint unit 70. The binary 0 from requestor 51 will be applied to driver 121 in address crosspoint unit 70. It is additionally assumed that the request for access signals from both requestors 50 and 51 arrive at the memory control unit 66 at substantially the same time. Thus, the module address will be decoded by address compare unit 77 for requestor 50 and address compare unit 87 for requestor 51. Thereafter a request recognized signal will appear at the output of AND gates 78 and 88 and will be applied through the respective AND gates 81 and 91 to the crosspoint flip-flops 82 and 92 so that both of these flip-flops will be set. Thus, before priority can be resolved by the application of the request recognized signal at the output of AND gate 78 to AND gate 91, the lower priority requestor 51 will have its request recognized signal applied to its crosspoint flip-flop 92, thereby setting this flip-flop. The binary 1 at the output of flip-flop 92 and the binary 1 at the output of flip-flop 82 will both be applied to enable the respective AND gates 123 and 126 for requestor 50 and 124 and 127 for requestor 51. With these AND gates enabled, the conflicting memory address bit at the output of drivers 120 and 121 will then appear at the output of these enabled AND gates. In particular the binary 1 of requestor 50 will appear at the output of AND gate 123 and the complement of the binary 0 of requestor 51 at the output of driver 121 will appear as a binary 1 at the output of AND gate 127. Thus, there will be a binary 1 applied to both data lines 73 and 74 so that the output of electronic device 105 in memory module 61 will be binary 0's on both output lines. In this way neither of the conflicting bits of address data is stored in the electronic device 105 and the input to presence detector 108 from electronic device 105 indicates that no data has been received. The conflict is removed by priority resolution in the crosspoint control unit 66. The complement of the request recognized signal in the output of AND gate 78 is applied at one input of AND gate 91 of lower priority requestor 51 to disable this AND gate 91 so that the requestor recognized signal at the output of AND gate 88 for requestor 51 will not be applied any longer to the set input of crosspoint flip-flop 92. Resolution is completed by the application of the binary 1 at the output of crosspoint flip-flop 82 of the higher priority requestor 50 to the reset input of crosspoint flip-flop 92 for the lower priority requestor 51. The application of this binary 1 to the reset input will cause the set output of the crosspoint flip-flop 92 to go to a binary 0, thereby removing the binary 1, which enabled AND gates 124 and 127 in the address crosspoint unit 70 for the lower priority requestor 51. With the disabling of AND gates 124 and 127, the only address information that will be present on the data lines 73 and 74 is the address information from requestor 50. Thus, there will be a binary 1 on data line 73 and a binary 0 on data line 74, which information will be transferred to electronic device 105 to be stored therein for use during the memory cycle of the memory 103 in the memory module 61.

Various changes may be made in the details of construction without departing from the spirit and scope of this invention as defined by the appended claims.

What is claimed is:

1. A transmission system for transmitting binary signals representative of a plurality of asynchronous binary data source signals arbitrarily designatable as "1" and "0" to a utilizing means, said system comprising:

(a) a plurality of pairs of transmission lines having transmitting ends and receiving ends, one pair of transmission lines being provided for each binary data source signal, each pair of transmission lines comprising first and second lines;

(b) a strobe source providing a binary strobe source signal concurrently with the provision of said binary data source signals, the binary value of said binary strobe source signal indicating whether or not transmission to said utilization means of binary signals representative of said binary data source signals is to be permitted;

(c) coupling means coupling binary signals representative of said binary strobe source signal to the transmitting ends of all of said transmission lines and coupling binary signals representative of each of said binary data source signals to the transmitting ends of a respective pair of transmission lines in a manner such that:

(1) the presence of one binary value of the binary strobe signal causes "1" binary signals to be applied to the transmission ends of both of the first and second lines of each pair of transmission lines regardless of the binary value of each lines respective binary data source signal, (2) the presence of the other value of the binary strobe source signal causes "1", "0" binary signals to be applied to the transmission ends of the first and second lines, respectively, of each pair of transmission lines if each lines respective binary data source signal is a "1" or causes "0", "1" binary signals to be applied to the transmission ends of the first and second lines, respectively, of each pair of transmission lines if each lines respective binary data source signal is a "0";

(d) a plurality of electronic devices, one for each pair of transmission lines, each electronic device having first and second input terminals and first and second output terminals said first and second output terminals being designated as the "off" and "on" terminals, respectively, said first and second input terminals being coupled to the receiving ends of the first and second lines, respectively, of a respective pair of transmission lines, each electronic device being constructed and arranged to operate in a manner such that: (1) "1", "1" binary signals applied to its first and second input terminals produce "0", "0" binary signals at its first and second output terminals, (2) "1", "0" binary signals applied to its first and second input terminals, respectively, produce "1", "0" binary signals at its first and second output terminals, respectively, (3) "0", "1" binary signals applied to its first and second inputs, respectively, produce "0", "1" binary signals at its first and second output terminals, respectively, and (4) "0", "0" binary signals applied to its first and second inputs following either "1", "0" or "0", "1" binary signals cause no change in the binary signals at its first and second output terminals produced by the previously applied "1", "0" or "0", "1" binary signals;

(e) presence detection means coupled to the output terminals of said electronic devices and responsive to the detection of a "1" binary signal on at least one output terminal of each of said plurality of electronic devices for providing a data presence output signal; and (f) means coupled to the output terminals of said electronic devices and responsive to said data presence output signal for causing the binary signals on the output terminals of said electronic devices to be passed to said utilization means.

2. The invention in accordance with claim 1, wherein each electronic device comprises:

first and second OR gates each having at least first and second input terminals and an output terminal, the first terminals of said first and second OR gates respectively constituting said first and second second input terminals of said electronic device; and first and second inverters each having an input terminal and an output terminal, the input terminals of said first and second inverters being respectively coupled to the output terminals of said first and second OR gates, and the output terminals of said first and second inverters being respectively coupled to the second inputs of the second and first OR gates, the output terminals of the first and second inverters constituting said first and second output terminals, respectively, of said electronic device.

3. The invention in accordance with claim 2, wherein said utilization means is of a type which after having binary signals passed thereto, it is desirable to permit response to next following binary signals only after a predetermined time period, and wherein said system includes control means responsive to said data presence output signal for causing "0", "0" binary signals to be applied to the inputs of each of said electronic devices for at least said predetermined time period.

4. The invention in accordance with claim 3, wherein said control means also includes means for inhibiting operation of said presence detection means for at least said predetermined time period following production of said data presence output signal.

* * * * *

UNITED STATES PATENT AND TRADEMARK OFFICE
CERTIFICATE OF CORRECTION

PATENT NO. : 4,241,419

DATED : December 23, 1980

INVENTOR(S) : Reinhard K. Kronies

It is certified that error appears in the above-identified patent and that said Letters Patent are hereby corrected as shown below:

Col. 5, line 29, change "for", second occurrence, to --of--.
Col. 9, line 15, after "output" insert --of--;
line 27, change "devices" to --device--.

Signed and Sealed this

Seventh Day of April 1981

[SEAL]

Attest:

RENE D. TEGTMEYER

Attesting Officer     Acting Commissioner of Patents and Trademarks